United States Patent
Steennis et al.

(10) Patent No.: US 7,372,280 B2
(45) Date of Patent: May 13, 2008

(54) METHOD AND SYSTEM FOR TRANSMITTING AN INFORMATION SIGNAL OVER A POWER CABLE

(75) Inventors: Evert Frederik Steennis, Arnhem (NL); Petrus Arnoldus A. F. Wouters, Eindhoven (NL); Petrus C. J. M. Van der Wielen, Nijmegen (NL); Jeroen Veen, Arnhem (NL)

(73) Assignee: Stichting Voor DE Technische Wetenschappen, Utrecht (NL)

( * ) Notice: Subject to any disclaimer, the term of this patent is extended or adjusted under 35 U.S.C. 154(b) by 252 days.

(21) Appl. No.: 10/519,303

(22) PCT Filed: Jun. 23, 2003

(86) PCT No.: PCT/NL03/00464

§ 371 (c)(1),
(2), (4) Date: Nov. 4, 2005

(87) PCT Pub. No.: WO2004/013642

PCT Pub. Date: Feb. 12, 2004

(65) Prior Publication Data

US 2006/0164099 A1    Jul. 27, 2006

(30) Foreign Application Priority Data

Jun. 21, 2002   (NL) .................................... 1020925

(51) Int. Cl.
*G01R 31/08* (2006.01)
*G01R 31/12* (2006.01)
*H01H 9/50* (2006.01)
*H04B 3/00* (2006.01)
*H04L 25/00* (2006.01)

(52) U.S. Cl. ...................... 324/536; 375/258

(58) Field of Classification Search ............... 324/536; 375/257, 258

See application file for complete search history.

(56) References Cited

U.S. PATENT DOCUMENTS

| | | | | |
|---|---|---|---|---|
| 5,856,776 A | * | 1/1999 | Armstrong et al. | 340/538.15 |
| 6,407,987 B1 | * | 6/2002 | Abraham | 340/310.17 |
| 6,452,482 B1 | * | 9/2002 | Cern | 340/340.17 |

OTHER PUBLICATIONS van der Wielen, et al., "Determination of Substation Model for Correct Interpretation of Online Measured PD Signals from MV Cable Systems," *Eindhoven University of Technology—Department of Electrical Engineering*, no date.

(Continued)

*Primary Examiner*—Andrew H. Hirshfeld
*Assistant Examiner*—Timothy J Dole
(74) *Attorney, Agent, or Firm*—Bret E. Field; Bozicevic Field & Francis LLP.

(57) ABSTRACT

The invention relates to a method for inputting an information signal into a power cable which is connected to a voltage supply and which includes at least one or more conductors, a dielectric provided around the conductors and a conductive earth sheath arranged wholly or partially around the dielectric, the method inclucing inputting a pulse-like information signal at a first position via the earth sheath in order to produce a corresponding pulse-like information signal which is propagated to a second position in the dielectric of the power cable.

25 Claims, 5 Drawing Sheets

OTHER PUBLICATIONS van der Weilen, et al., "On-line Partial Discharge Detection of MV Cables with Defect Localisation (PDOL) Based on Two Time Synchronised Sensors," (2005) *Cired, 18th International Conference on Electricity Distribution, Session No. 1, Jun. 6th - Jun. 9th*.

van der Wielen, et al., "Time-based Alignment of PD Signals Measured at Multiple Cable Ends," *Eindhoven University of Technology—Department of Electrical Engineering*, no date.

Veen, et al., "Cancellation of Continuous Periodic interference for PD Detection," *Enidhoven University of Technology—Department of Electrical Engineering*, no date.

Veen, et al., "PD Location in Power Cables using Parametric Models," *Eindhoven University of Technology—Department of Electrical Engineering*, no date.

Wouters, et al., "Challenges Related to Development of an On-line PD Detection and Localisation System," (2003) *Nordic Insulation Symposium, Tampere*.

Wouters, et al., "Effect of Cable Load Impedance on Coupling Schemes for MV Power Line Communication," (2003) *based on presentation before the IEEE Bologna PowerTech conference, Jun. 23rd-Jun. 26th*.

\* cited by examiner

METHOD AND SYSTEM FOR TRANSMITTING AN INFORMATION SIGNAL OVER A POWER CABLE

The present invention relates to a method and system for inputting and transmitting an electrical information signal into and over a voltage-carrying power cable which comprises at least one or more conductors, a dielectric provided around the conductors and a conductive earth sheath arranged around the dielectric.

Underground power cables or power lines are used to transport electrical energy from a power station to a point of use. This takes place at diverse voltages, for instance at about 400 kilovolt for high-voltage cables to about 200 Volts for low-voltage cables. Owing to the high voltages occurring on the conductor or the conductors in the power cables the conductors are enclosed by an electrically insulating material, also referred to as dielectric. The insulating casing of the conductors is also wholly or partly enclosed by a metal earth sheath or earth shield. Additional protective casings, such as for watertightness, mechanical protection and so on, can be arranged in and around the cable.

Not only when a power cable is non-operational but also when the power cable is operational, i.e. when one or more of the conductors are in a voltage-carrying mode, it can be useful to send information-carrying signals from the one end of the power cable to the other end of the cable. The information signals can be applied for diagnostic purposes of the power cable itself, for instance for determining the quality of the dielectric around the voltage-carrying conductors or for sending other data back and forth.

The drawback of known systems is that the information signals are inputted by equipment which is directly coupled to the voltage-carrying conductor(s) of the power cable. In view of the relatively high voltages which occur, this makes heavy demands of the equipment used for transmission.

The drawback of other known systems is that the information signals are inputted via the earth shield or the earth sheath, with the earth (the ground) between the end points of the cable as return conductor. In this case these information signals are not shielded from the environment and can thereby disturb the environment (EMC management). In some power cables the earth shield or the earth sheath is further earthed over the greater if not the whole length of the cable, whereby the signal transfer is not possible in these known systems, or hardly so.

It is an object of the present invention to provide a method and system in which the above stated drawbacks and other, as yet unstated drawbacks of the prior art are obviated and in which signals are transmitted over the power cable without direct contact being made with the voltage-carrying conductors and without the signals disturbing the environment, and without the signals being attenuated in the case of a (practically) permanent earthing of the earth sheath or the earth shield of the power cable.

According to a first aspect of the present invention there is provided for this purpose a method for inputting an information signal into a power cable which can be connected to a voltage source and which comprises at least one or more conductors, a dielectric provided around the conductors and a conductive earth sheath arranged wholly or partially around the dielectric, the method comprising of inputting a pulse-like information signal at a first position in the earth sheath in order to produce a corresponding pulse-like information signal over the dielectric between the conductors and the earth sheath. By injecting a current pulse into the earth sheath at a first position, for instance a first cable end, a voltage pulse is produced at that position over the insulation (the dielectric) of the power cable. The current path is herein closed via other components in the high-voltage connection (to the extent they are present). The thus produced voltage pulse in the power cable displaces to a second position, for instance at another cable end, where the voltage pulse can be detected in per se known manner.

The information signal is inputted using one or more coils, and inputted directly into the earth sheath and/or into an earth wire between the earth sheath and the earth and/or into an earth wire between the voltage source and the earth, preferably by making use of one or more coils provided at a position between the voltage source and the earth.

In the above stated manner data can be transmitted between said positions in simple manner via the earth sheath, without the equipment required for this purpose being exposed to the high electrical voltages of the power supply, without the transmitted signals disturbing the environment and without the transmitted signals being attenuated in the case of a (practically) permanent earthing of the earth sheath or the earth shield of the power cable.

In a particular preferred embodiment the data comprise information which is used for general data communication between the cable ends.

In another preferred embodiment the data comprise information which is used to synchronize the time between the first position and the location where the data are received, being the second position. A step-like pulse (with a maximum feasible rise time, the feasibility thereof depending on the system variables) is herein inputted at the first position, whereafter this voltage step translates into a step-like pulse which arrives at the second position some time later. The difference in time between the pulse injection at the first position and receiving of the pulse at the second position corresponds with the travel time of the pulse through the power cable (plus the time required for pulse injection at the first position and pulse detection at the second position). It is hereby possible to synchronize clocks with each other at the first and second position, taking into account this difference in, travel time.

The required accuracy of the time synchronization determines how often the time synchronization pulses must be repeated. With the present crystal oscillators a time synchronization of several tens of nanoseconds is possible at a repetition frequency of about one time synchronization pulse per second. This provides the option of localizing defects occurring in the cable with an accuracy of about 1% of the cable length. This is because these defects themselves generate voltage pulses, the difference in the arrival time of which at the first and second position, together with the clock times which are known up to a determined accuracy through time synchronization, are characteristic for the location of the defect.

In a further preferred embodiment the data comprise information which is sent at the first position after a fixed time has elapsed after the arrival of a voltage pulse at this first position, this pulse coming from a fault in the power cable itself. This fault has also given a voltage pulse at the second position. The arrival time of this voltage pulse at the second position, together with the arrival time of this transmitted information from the first position, provides the possibility of calculating the location of the fault.

According to another aspect of the present invention, there is provided a system for inputting an electrical information signal into a power cable which can be connected to a voltage source and which comprises at least one or more conductors, a dielectric provided around the conductors and a conductive earth sheath arranged wholly or partially around the dielectric, comprising:

inputting means for inputting a pulse-like information signal into the earth sheath at a first position, herein producing a corresponding pulse-like information signal over the dielectric between the conductors and the earth sheath, which signal is propagated to a second position.

The inputting means preferably comprise one or more coils which are positioned close to the earth sheath, earth wire and/or the line between the voltage source and the earth and with which a current pulse can be inputted. This current pulse causes a corresponding voltage pulse over the dielectric of the power cable without herein making contact with voltage-carrying parts of the power cable.

In particular embodiments impedance-increasing means, preferably one or more ferrite-containing elements, are provided whereby the impedance in one or more earth wires can be increased locally such that the current pulse in the earth sheath results in a corresponding and measurable voltage pulse over the dielectric of the power cable. Without these impedance-increasing means the current pulse could be generated in the wrong circuit without a corresponding voltage pulse herein being generated in the dielectric.

For the above stated determining of for instance the position of irregularities in a conductor, which irregularities result in a partial discharge in the power cable, in a further embodiment the system also comprises detecting means for detecting the voltage pulses propagated along the power cable. These voltage pulses can be the result of current pulses inputted by the inputting means, but may also be the result of the above mentioned partial-discharges.

For an accurate determination of the position of an irregularity, the system comprises in a further preferred embodiment first respectively second time registering means and time synchronizing means positioned at the first and second position in order to synchronize the time registering means relative, to each other using an information signal inputted into the earth sheath.

Further advantages, features and details of the present invention will become apparent from the following description of a number of preferred embodiments thereof. Reference is made in the description to the figures, in which.

Figure 1:
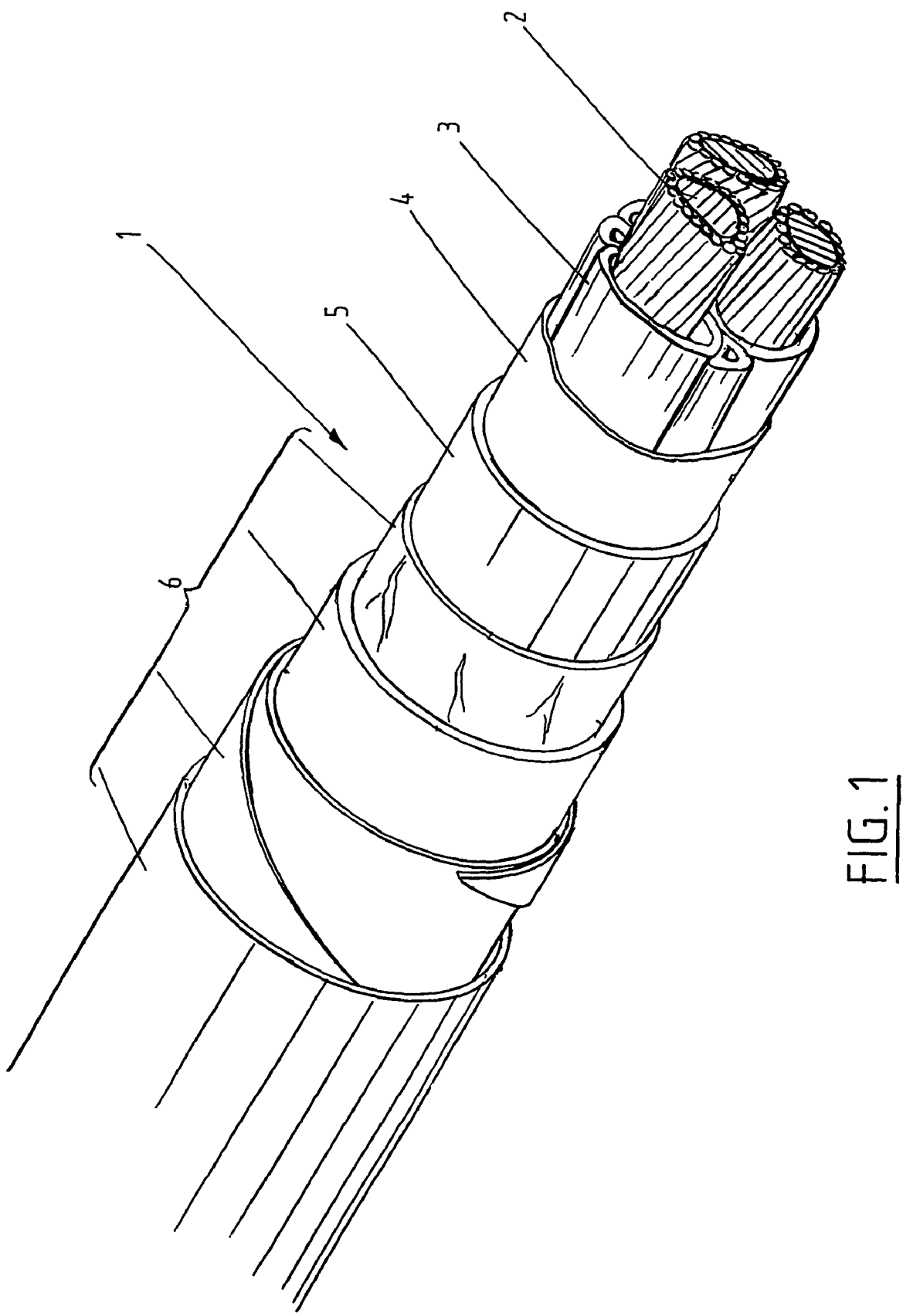
FIG. 1 shows a partly cut-away view of a power cable.

FIG. 1 shows by way of example a high-voltage cable 1. In the shown embodiment three conductors 2 are provided in the centre of high-voltage cable 1. A frequently occurring alternative (not shown) is a cable with one conductor. The cable can generally contain one or more conductors. The conductors are connected to a high-voltage or low-voltage grid. Around the conductors are provided one or two centred, insulating material layers 3 and/or 4. The insulating material layers 3 and 4 form the dielectric of the cable.

Provided around the outer insulating layer is an earth sheath or earth shield 5 which is connected to earth wire 7 of the electricity grid. The earth shield can be arranged all the way around the insulation. Partial enclosing of the insulation by earth shield 5 also occurs. It is noted that the term "earth shield" is understood to mean all possible embodiments of a cable earth, such as an earth wire, an earth sheath which encloses the insulation wholly or only partially and which consists of interwoven wires (for instance copper wires) or a solid metal layer, and so on.

Additional protective layers 6 are arranged around earth shield 5 to protect the cable against adverse chemical and mechanical effects from outside. These additional layers are conceivable but are not all applied in all cases. Power cable 1 has a length of several tens of metres to tens of kilometres.

Figure 2:
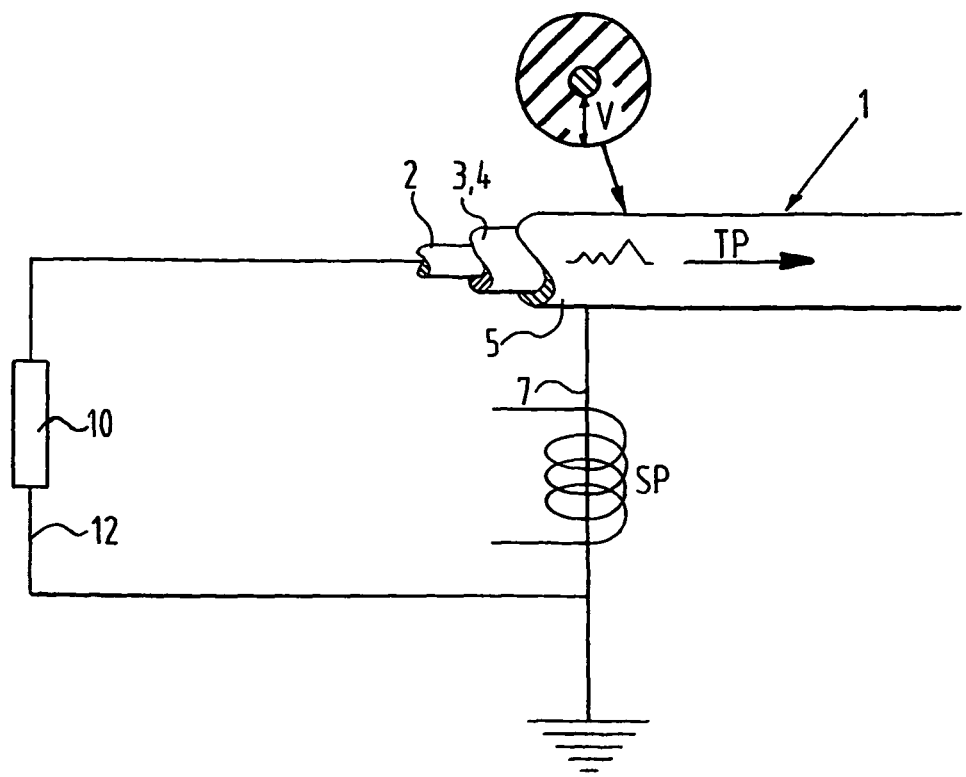
FIG. 2 shows a schematic view of a first preferred embodiment of a system according to the invention.

FIG. 2 shows a first preferred embodiment of the system. On the conductor(s) of power cable 1 there is an alternating voltage between 200 V and 400 kV. The frequency of this alternating voltage is either the mains frequency (examples: 50 Hz in Europe, 60 Hz in the USA) or the typical frequency associated with a voltage source which is arranged in order to test the cable (for instance 0.1 Hz or an oscillating voltage). As can be seen in FIG. 2, the cable is connected to a mains component 10. Mains component 10 can be a transformer and/or another power cable or any other voltage-carrying mains component.

The earth sheaths of the power cables are usually earthed at their ends with an earth wire. In the case that a cable is not disconnected from the electricity grid and there is therefore an on-line situation, it is possible to use this earth wire and the earth sheath of the cable connected thereto for diverse purposes, including data communication and time synchronization, as will be described hereinbelow.

FIG. 2 shows that a coil SP is positioned around earth wire 7, wherein the earth wire is electrically connected to earth sheath 5. Coil SP injects a short current pulse into earth wire 7, which brings about a voltage pulse corresponding therewith (arrow V) over the dielectric of power cable 1, since the current path via other components (mains component 10 and the like) in the high-voltage connection (to the extent they are present) is closed. The thus produced voltage pulse is, displaced to a second position, for instance on another cable end, where the voltage pulse can be detected in a per se known manner.

This means that a pulse can be transmitted through the power cable, wherein the power cable is optionally under high voltage, without there being direct contact herein between the high voltage-carrying parts and the parts inputting the pulse into the power cable. For inputting of the pulse it is therefore not per se required (depending on the local conditions in respect of the embodiment of the cable end and the other high-voltage components and depending on the local safety guidelines it is conceivable that, during arranging and, after use, during removal of the coil the supply voltage must be switched off) that the conductors of the power cable have to be disconnected from the voltage.

Figure 3:
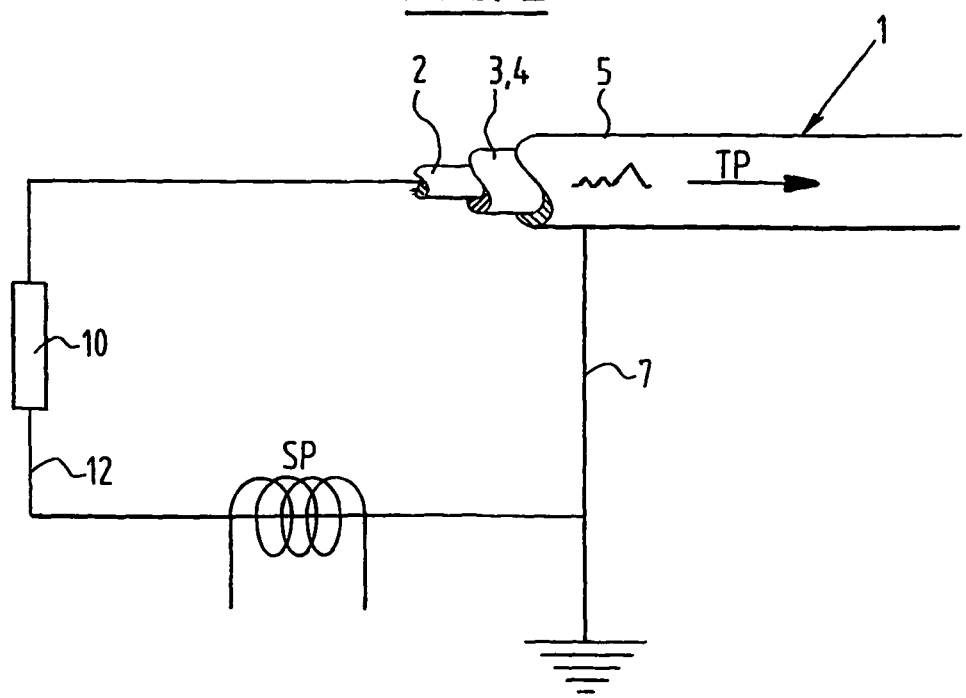
FIG. 3 shows a schematic view of a second preferred embodiment of a system according to the invention.

FIG. 3 shows another embodiment in which coil SP is positioned around the line 12 between voltage source 10 and the earth. In accordance with that described above, a current pulse can be inputted using coil SP, which pulse produces a voltage pulse (V) over the dielectric of the power cable.

Figure 4:
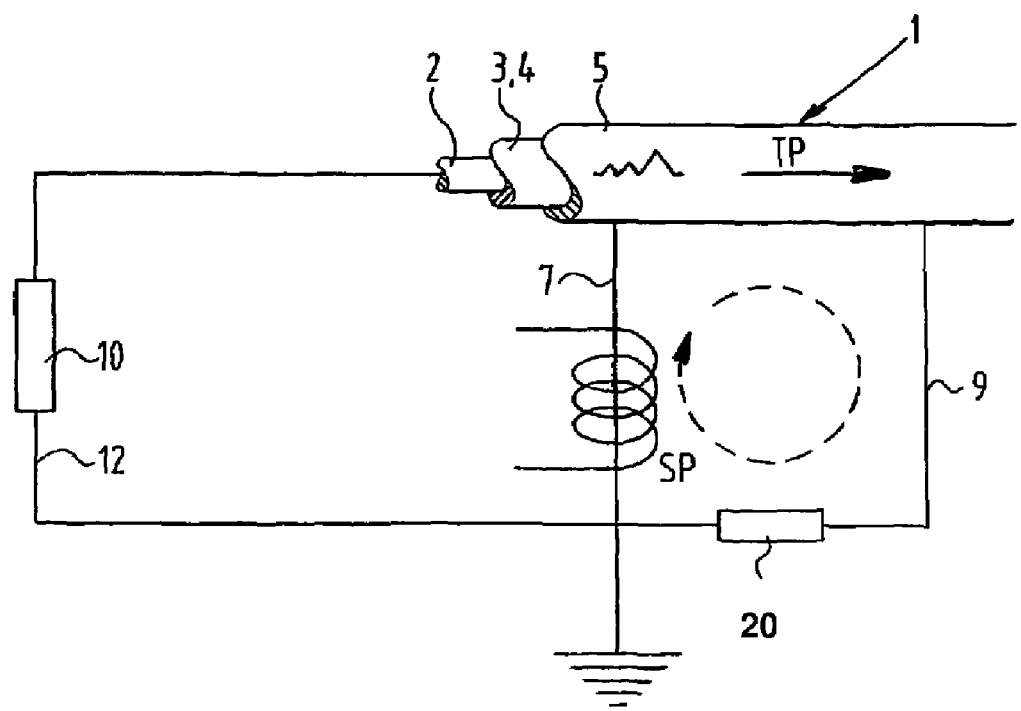
FIG. 4 shows a schematic view of a third preferred embodiment of a system according to the invention.

FIG. 4 shows a further embodiment. In addition to earth wire 7 an additional (second, third, and so on) earth wire 9 is applied. When coil SP is now positioned around earth wire 7 a circuit is created via earth wire 9 (dashed line) since the impedance of the components such as mains component 10 is usually greater than the impedance of the current path via earth wire 9. In order to still produce a sufficiently large voltage pulse over the dielectric, the right-hand circuit can be interrupted by opening it. It is also possible to arrange impedance-increasing elements 20, preferably in the form of one or more ferrite cores. These have the result that the current pulse injected into earth wire 7 produces a high voltage pulse in power cable 1 via line 12 such that it can be measured at the other end.

Figure 5:
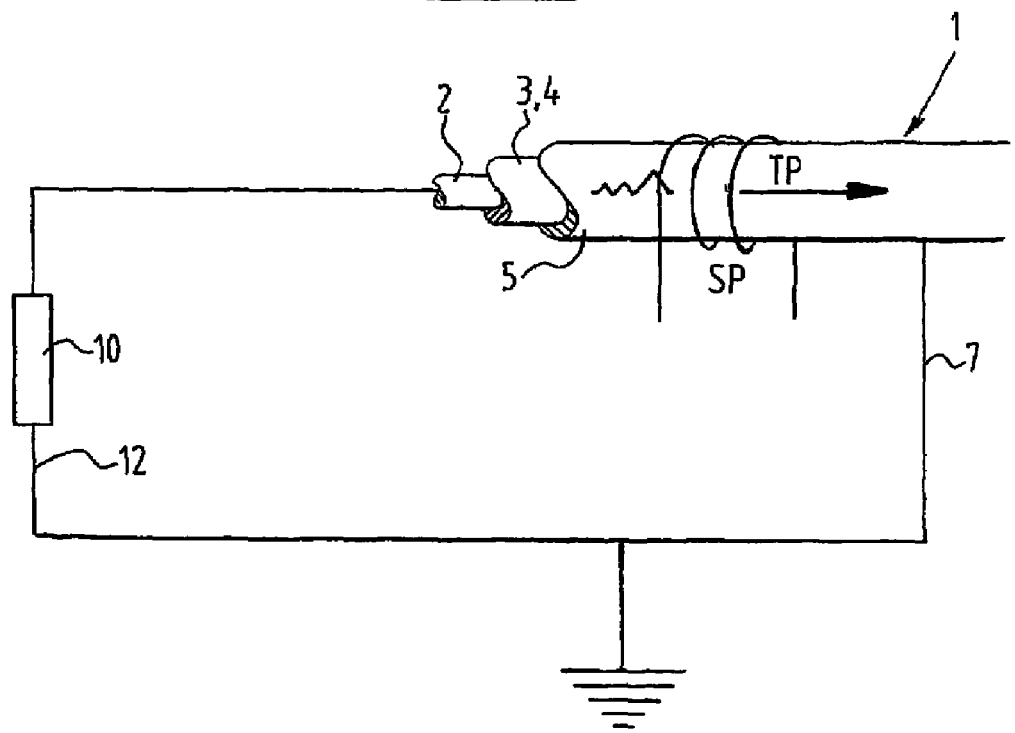
FIG. 5 shows a schematic view of a fourth preferred embodiment of a system according to the invention.

FIG. 5 shows a further embodiment in which coil SP is arranged around earth sheath 5 while earth sheath is earthed on the non-mains component (10) side of this coil SP.

Another preferred embodiment relates to diagnosis of the dielectric wherein use is made of transmission of the information signal between said positions. As a consequence of possible irregularities in the dielectric of the power cable, for instance at the position of a defect in the dielectric of the power cables a defect in the dielectric of cable joints or a defect in the dielectric of cable ends, and the relatively high voltages occurring on the conductor, so-called partial discharges can in any case result. Partial discharges can eventually result in loss of quality of the cable. Partial discharges are often the precursor of complete discharges, or breakdown, whereby the cable malfunctions and must be taken out of operation until after repair.

Each partial discharge produces a small voltage pulse (or current pulse) in the range of several milli-Volts to several Volts, characteristically between 10 mV and 10000 mV. The duration of the voltage pulse is very short, less than 1 microsecond, characteristically between 10 and 1000 ns.

The voltage pulses or voltage changes generated by the partial discharges are usually propagated in both directions of the conductor from the position of the partial discharge. Half of the voltage pulse is propagated to a first cable end and the other half is propagated to the other cable end. Both voltage pulses displace through the conductor at a speed which is practically equal to the speed of light (about 50% to 80% of 300,000 km/sec). The difference in arrival time of the two pulse signals at a first and a second position, for instance at both cable ends, can be used to determine the position of the irregularity causing this partial discharge. In the case of a double-sided measurement, two pulse signals which are caused by the same irregularity are measured, a first pulse signal is measured at a first position using a sensor and the second pulse is measured at the second positions using a sensor. Based on the difference in arrival time of the two pulse signals, the already known propagation characteristics of the cable (such as the propagation speed of the pulse signals) and the already known or unknown length of the cable, the position of the irregularity can be determined respectively in absolute or relative sense.

Crucial for a precise determination of the positions of irregularities in the dielectric or insulation material of power cables, cable joints and cable ends is the accuracy of the time registration with which the arrival times of the pulse signals caused by a partial discharge are registered. Known is the use of time data (Universal Time Coordinates) made available by the Global Positioning System (GPS) or of very accurate atomic clocks to enable a time registration with an accuracy in the order of magnitude of several (tens of) nanoseconds. Application of GPS time synchronization is expensive however, and an outdoor antenna is necessary at each cable end to enable the required GPS clock signals to be received. The use of atomic clocks has also been found to be expensive, and this has prevented use on a large scale.

Figure 6:
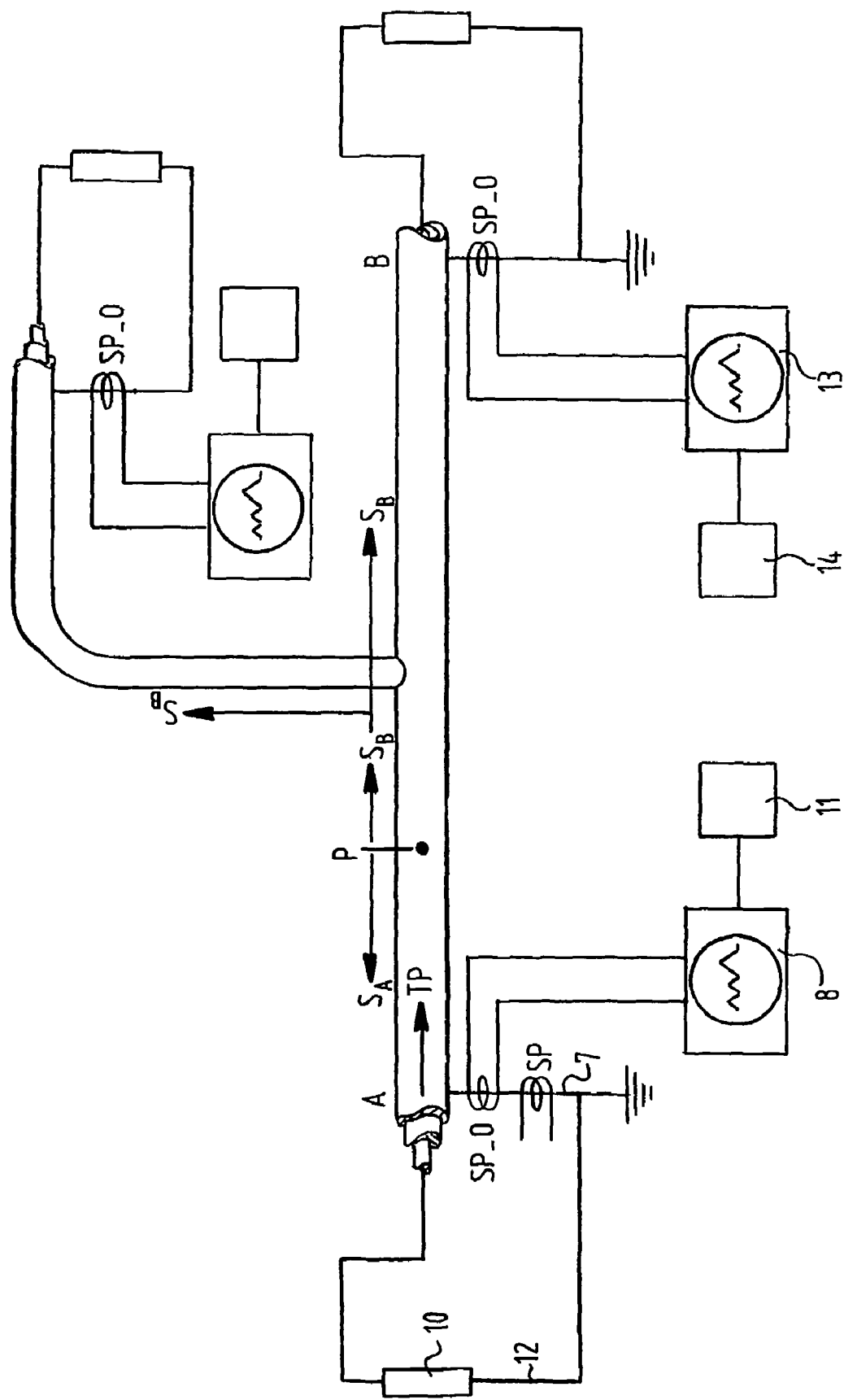
FIG. 6 shows a schematic view of a further preferred embodiment of a multilateral measuring system according to the invention in a branched cable.

FIG. 6 shows that a detector 8 (consisting for instance of a pulse receiving coil SP-O, which can be placed as shown in front of coil SP in FIGS. 2, 3, 4 or 5, and a registering apparatus such as a digitizer connected thereto) is connected close to the first position A to a time registering unit 11, and that a detector 13 is connected close to the second position B to a time registering unit 14. These units register the arrival times of the pulse signals arriving respectively at positions A and B.

Determining the position of an irregularity takes place as follows. As a result of a partial discharge P in cable 1, a first pulse signal $S_A$ displaces to the left in the direction of the first position A and a second pulse signal $S_B$ displaces to the right in the direction of the second position B. Both pulse signals displace at a known speed. Once they have arrived at positions A and B, pulse signals $S_A$ and $S_B$ are detected by respective detectors 8 and 13. The times at which pulse signals $S_A$ and $S_B$ are detected are then registered by respective time registering units 11 and 14. For this purpose the time registering units provide the detected pulse signals with a time label or time stamp with which the arrival time and the progression of the signals in time can be determined. The signal provided with a time label can then be stored on a random medium or, using the communication method to be discussed below, can be inputted as information pulse into the dielectric of the power cable and transmitted via the earth sheath of the cable to a central storage unit. The time difference DT can be determined from the differences in the thus registered arrival times of the two pulse signals. From the time difference DT, the known propagation speed of the pulse signals in the conductor and the already known length l of the cable, the position of the irregularity P can be determined to an accuracy of 1-100 m (depending on the total length l of cable 1). If the cable length is not known, the position of the irregularity can then be determined in a relative sense.

The above shows that the detection and time registration of the pulse signals are performed by independently operating detection and registering systems. For accurate determining of the times at which the pulse signals arrive at the different positions, the time registering units must be synchronized relative to each other. This synchronization can be carried out wholly independently of the position determination, for instance by performing the time registration before or after the position determination. Synchronization can however also be carried out during the position determination.

Synchronization takes place by injecting a time synchronization voltage pulse at cable end A by means of a coil SP, as described above. This time synchronization voltage pulse TP moves to the opposite cable end B, just as the above stated voltage pulse which resulted from the partial discharge. The time synchronization voltage pulse TP can be measured at cable end B with the same detector 13 with which pulse signal $S_b$ is measured. When the pulse injection at position A is repeated at a specific predetermined interval, the synchronization pulse will be detected at position B at the same interval. This makes it possible to synchronize the time registering unit 14 at position B with time registering unit 11 at position A. It is assumed here that the time registering units are stable during the interval of time between two synchronization pulses such that the time registration can be carried out with sufficient precision. After the time registering units have thus been synchronized relative to each other and the time labels of the received or still to be received pulse signals $S_A$ and $S_B$ can therefore be compared to each other, the differences in arrival time of the pulse signals can be precisely determined. By synchronizing the time registering units and thus enabling a sufficiently accurate determination of the differences in arrival time, special very accurate clocks, such as those of the above mentioned GPS system, can be dispensed with. It is possible to suffice with relatively simple clocks known in the field, or even counters known in the field, since it is not the absolute time but only the relative time in relation to the synchronization times which is important.

Figure 7:
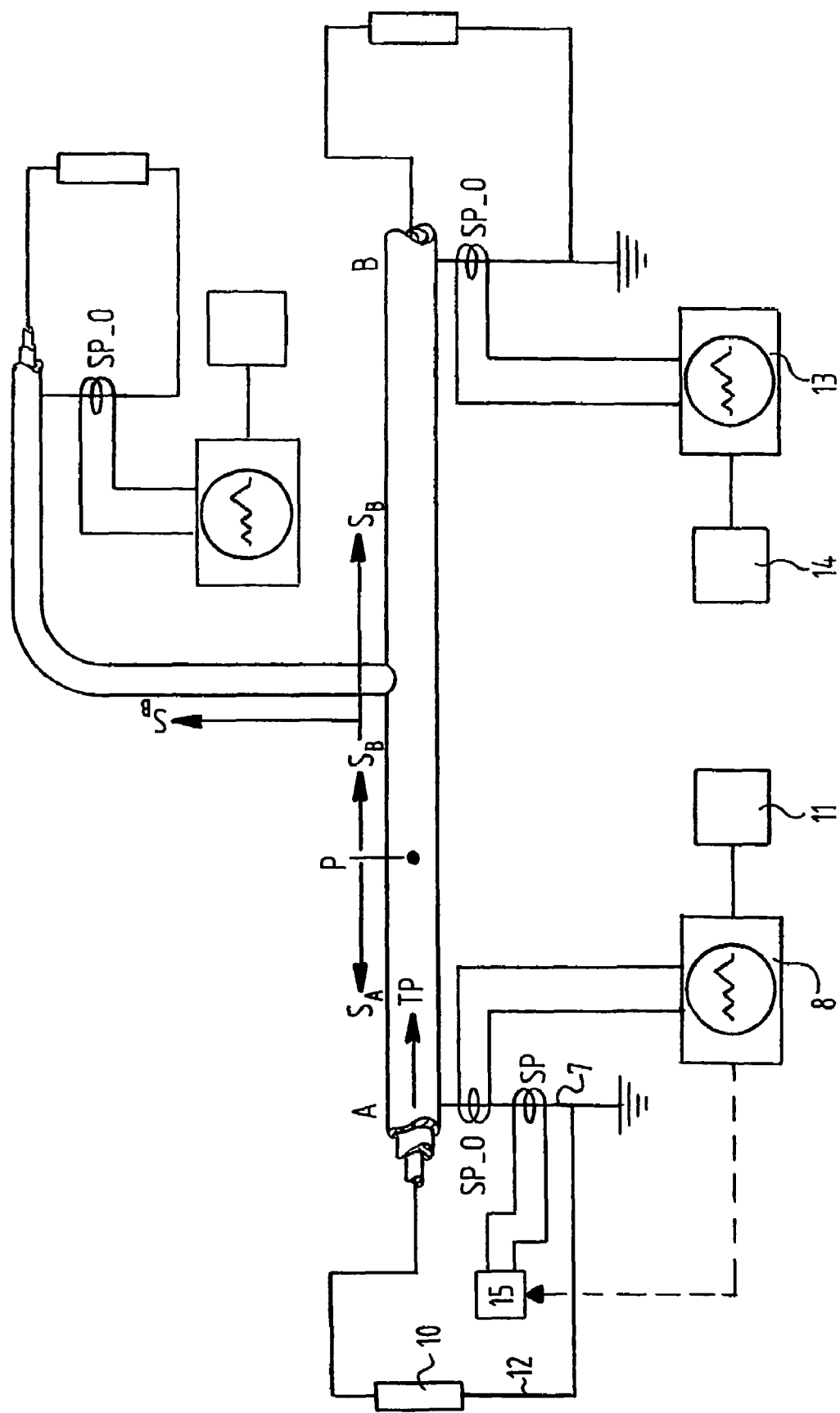
FIG. 7 shows a schematic view of another further preferred embodiment of a multilateral measuring system according to the invention in a branched cable.

FIG. 7 shows another preferred embodiment of the invention. In this embodiment a detector 13 and a time registering unit 14 are provided at the right-hand end B of cable 1. Detector 13 detects the pulse signal $S_B$, which has displaced to the right, at point in time Tc and time registering unit 14 provides this pulse signal $S_B$ with a time label with which the arrival time Tc of pulse signal $S_B$ can be inferred. The pulse signal $S_A$ displacing to the left is received by a detector 8. The detector then operates a responder 15 which sends back a synchronization pulse TP to position B via coil SP at point in time Tb. Detector 13 then detects the arrival of synchronization pulse TP, whereupon time registering member 14 provides the received synchronization pulse TP with a time label. Time registering unit 14 is connected to a computer (not shown) (wherein a computer is understood to mean any electronic processing device). The computer determines the arrival time Ta of the first voltage pulse signal $S_A$ on the basis of the travel time of synchronization pulse TP, wherein the arrival time of the first pulse signal $S_A$ at position A is the same as the arrival time of synchronization pulse TP at position B minus the travel time of the synchronization pulse (equal to the predetermined cable length l divided by the propagation speed of the pulse through the cable) and minus a preset time delay (Dt) which is equal to the time which elapses between receiving of the first voltage signal at position A and sending of the synchronization pulse with transponder 15. Once the arrival times of the first and second pulse signals are known, the position of the irregularity causing the partial discharge can be determined in the above described manner.

The time synchronization pulses can also be used for data communication between the two cable ends, for instance by sending and receiving further pulses in a specific rhythm after the synchronization pulse. These data can for instance be used for further adjustment of the measuring equipment on both ends of the power cable or to send the outcomes of the time labelling process to a particular cable end, where the outcomes can be further processed.

It is also possible to include control data in the information signals for controlling the substations to which the power cable is connected, or data about the power cable itself. When for instance a disturbance occurs in a substation of the, external electricity grid, data concerning the nature, size and the like of this disturbance can be sent via the earth sheath of the power cable without the voltage herein having to be removed from the power cable. These data can then cause an operator to have the substation in question repaired. It is also possible to send data back to the substation with the purpose of controlling the substation such that the disturbance is remedied. The fixed telephone connections to the substations often used in practice for this purpose can hereby be omitted.

The present invention is not limited to the above described preferred embodiments thereof. The rights sought are defined by the following claims, within the scope of which many modifications can be envisaged.

The invention claimed is:

1. Method for inputting an information signal into a power cable which is connected to a voltage supply including a voltage source and which comprises at least one or more conductors, a dielectric provided around the conductors and a conductive earth sheath arranged wholly or partially around the dielectric, the method comprising of inputting an information signal at a first position in the power cable to produce a corresponding information signal propagating to a second position of the power cable, characterized in that the step of inputting an information signal in the power cable comprises inputting a pulse-like information signal at the first position in the earth sheath in order to produce a corresponding pulse-like information signal over the dielectric between the one or more conductors and the earth sheath of the power cable, which corresponding information signal is propagated in the dielectric of the power cable to a second position.

2. Method according to claim 1, wherein the step of inputting an information signal in the earth sheath further comprises of injecting a current pulse into the earth sheath, producing a voltage pulse over the dielectric of the power cable.

3. Method according to claim 2, wherein injecting the current pulse in the earth sheath further comprises closing a current path via other components in the voltage supply to produce the voltage pulse over the dielectric.

4. Method according to any of claims 1-3, wherein inputting of a pulse-like information signal into the power cable comprises of inputting the information signal directly into the earth sheath, into an earth wire between the earth sheath and the earth and/or into a line between the voltage source and the earth.

5. Method according to claim 4, further comprising the steps of providing one or more coils on a position close to the earth sheath, earth wire and/or the line between the voltage source and the earth so as to inject a current pulse causing a voltage pulse over the dielectric without contact with said one or more conductors of the power cable.

6. Method according to claim 1, further comprising of transmitting data between said positions via the power cable.

7. Method according to claim 6, wherein said data comprise control data or data about the power cable itself.

8. Method according to claim 1, comprising of synchronizing the time between the first and second position.

9. Method as claimed in claim 8, further comprising of periodically transmitting a synchronization information signal at a predetermined time interval and periodically synchronizing time registering means arranged close to the first and second position using the periodically transmitted synchronization signal.

10. Method as claimed in claim 8 or 9, further comprising of diagnosing the dielectric on the basis of transmitting the information signal between said positions.

11. Method according to claim 1, wherein the power cable comprises one or more branches.

12. Method according to claim 1, further comprising of inputting the information signal when one or more of the conductors are in a voltage-carrying mode.

13. Method according to claim 1, wherein the voltage source is a station of an external electricity grid.

14. System for inputting an electrical information signal into a power cable which is connected to a voltage supply including a voltage source and which comprises at least one or more conductors, a dielectric provided around the conductors and a conductive earth sheath arranged wholly or partially around the dielectric, comprising:

inputting means for inputting an information signal at a first position in the power cable, herein producing a corresponding information signal which is propagated to a second position in the dielectric of the power cable, characterized in that the inputting means are arranged so as to input a pulse-like information signal at the first position in the earth sheath in order to produce a corresponding pulse-like information signal over the dielectric between the one or more conductors and the earth sheath of the power cable, which corresponding information signal is propagated in the dielectric of the power cable to the second position.

15. System according to claim 14, wherein the inputting means are arranged so as to inject a current pulse into the earth sheath, producing a voltage pulse over the dielectric of the power cable.

16. System according to claim 15, wherein the voltage supply includes an earth wire between the earth sheath and the earth and/or a line between the voltage source and the earth and wherein the inputting means are embodied so as to inject the current pulse directly into the earth sheath, into said earth wire and/or into said line.

17. System according to claim 16, wherein the inputting means comprise one or more coils positioned close to the earth sheath, earth wire and/or the line between the voltage source and the earth so as to input a current pulse causing a voltage pulse over the dielectric without contact with said one or more conductors of the power cable.

18. System according to claim 17, further comprising impedance-increasing means whereby the impedance in one or more earth wires can be increased locally such that the information signal to be inputted causes a corresponding pulse-like information signal particularly in the dielectric of the power cable.

19. System as claimed in claim 18, wherein the impedance-increasing means comprise one or more ferrite elements arranged in the relevant earth wire(s).

20. System as claimed in any of the claims 14-16, also comprising detecting means for detecting the voltage pulses propagated along the power cable.

21. System as claimed in any of the claims 14-16, further comprising first respectively second time registering means and time synchronizing means positioned at the first and second position for the purpose of synchronizing the time registering means relative to each other using an information signal inputted into the earth sheath.

22. System as claimed in claim 21, wherein the inputting means are adapted to input the information signal periodically at a predetermined time interval and the synchronizing means are adapted to periodically synchronize the first and second time registering means.

23. System as claimed in claim 22, wherein the inputting means, a detecting means and a time registering means are adapted to determine the positions of irregularities causing partial discharges in the dielectric of the power cable.

24. System according to claim 14, wherein the voltage source is a station of an external electricity grid.

25. System according to claim 14, wherein the voltage on the voltage-carrying cables lies in the range of 200 V to 400 kV.

* * * * *